(12) United States Patent
Fu et al.

(10) Patent No.: US 8,279,847 B2
(45) Date of Patent: Oct. 2, 2012

(54) METHOD AND APPARATUS FOR EXCHANGING INFORMATION WITH A BASE STATION

(75) Inventors: Pin-Feng Fu, Shenzhen (CN);
Shih-Fang Wong, Taipei Hsien (TW);
Zhan-Wu Li, Shenzhen (CN);
Chun-Hua Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1349 days.

(21) Appl. No.: 11/941,975

(22) Filed: Nov. 19, 2007

(65) Prior Publication Data
US 2008/0227496 A1    Sep. 18, 2008

(30) Foreign Application Priority Data
Mar. 13, 2007  (CN) .......................... 2007 1 0200273

(51) Int. Cl.
*H04J 1/00* (2006.01)

(52) U.S. Cl. ..................................... 370/343; 455/562.1

(58) Field of Classification Search ................... 455/562, 455/562.1; 370/343
See application file for complete search history.

(56) References Cited

U.S. PATENT DOCUMENTS

| | | | |
|---|---|---|---|
| 6,054,966 A | 4/2000 | Haapala | |
| 6,397,053 B1 | 5/2002 | Ghiazza | |
| 6,424,302 B1 | 7/2002 | Wu | |
| 6,445,937 B1 * | 9/2002 | daSilva | 455/574 |
| 2003/0043766 A1 * | 3/2003 | McDonough et al. | 370/335 |
| 2005/0009510 A1 * | 1/2005 | Tsuda et al. | 455/418 |
| 2007/0135171 A1 * | 6/2007 | Hara | 455/562.1 |

FOREIGN PATENT DOCUMENTS

CN    1357174 A    7/2002

* cited by examiner

*Primary Examiner* — Sai-Ming Chan
(74) *Attorney, Agent, or Firm* — Altis Law Group, Inc.

(57) ABSTRACT

A method for exchanging information with a base station includes: communicating with the base station using electromagnetic waves with a first frequency; detecting a first connection request carried in the first electromagnetic; receiving the first connection request if the first connection request is detected; and receiving information carried in the electromagnetic waves with a second frequency that is higher than the first frequency from the base station. An apparatus for exchanging information with the base station is also disclosed.

20 Claims, 6 Drawing Sheets

METHOD AND APPARATUS FOR EXCHANGING INFORMATION WITH A BASE STATION

BACKGROUND

1. Field of the Invention

The present invention generally relates to methods and apparatuses for exchanging information with a base station, particularly to a method and an apparatus for receiving radio signals from the base station and transmitting the radio signals to the base station.

2. Description of Related Art

Referring to FIG. 6, a conventional communication system 999 includes a communication apparatus 50 and a base station 70. The communication apparatus 50 includes a transceiver unit 52, a detector 54, and a processing unit 56. The communication apparatus 50 can be a mobile phone, a PDA (Personal Digital Assistant), and so on.

In operation, when in a standby state, the transceiver unit 52 of the communication apparatus 50 communicates with the base station 70 using electromagnetic waves. When in a communication state, the detector 54 detects that a communication signal is received by the transceiver unit 52, the detector 54 enables the processing unit 56. The processing unit 56 receives the communication signal and processes the communication signal to obtain main communication information such as voice data, text data, image data, and so on.

However, no matter what states the communication apparatus is in, the communication state or the standby state, high frequencies of the electromagnetic waves such as 800 MHz, 900 MHz, 1800 MHz, 1900 MHz are widely used in the communication apparatus. Part of the electromagnetic waves are absorbed by user's bodies, and if the frequencies get higher, harm to the users gets larger.

Therefore, improvements for a method and an apparatus for exchanging information with a base station are needed in the industry to address the aforementioned deficiency.

SUMMARY

A method for exchanging information with a base station includes: communicating with a base station by electromagnetic waves with a first frequency; detecting a first connection request carried in the first electromagnetic; receiving the first connection request if the first connection request is detected; and receiving information carried in electromagnetic waves with a second frequency that is higher than the first frequency from the base station. An apparatus for exchanging information with the base station is also disclosed.

Other advantages and novel features of the present invention will become more apparent from the following detailed description of preferred embodiment when taken in conjunction with the accompanying drawings, in which:

DETAILED DESCRIPTION OF THE EMBODIMENT

Reference will now be made to the drawings to describe a preferred embodiment of the present method and a preferred embodiment of the present apparatus.

Figure 1:
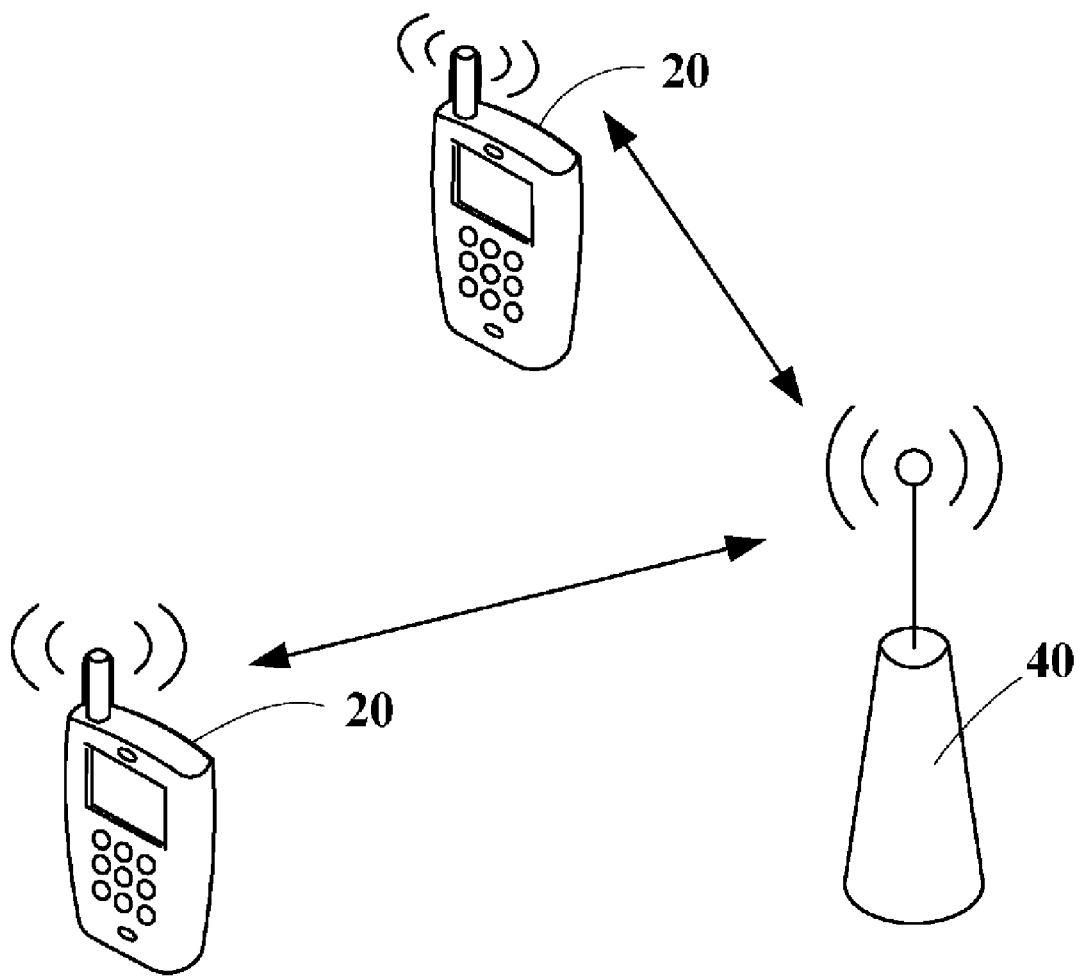
FIG. 1 is a schematic diagram showing a mobile communication system.

Referring to FIG. 1, a mobile communication system 10 is illustrated. The mobile communication system 10 includes two apparatuses 20 and a base station 40. The base station 40 is used as a virtual bridge to connect the two apparatuses 20. Actually, the base station 40 is for transmitting radio signals between the two apparatuses 20 using electromagnetic waves. The apparatuses 20 can be any wireless transceivers, and in the preferred embodiment the apparatuses 20 are mobile phones.

Figure 2:
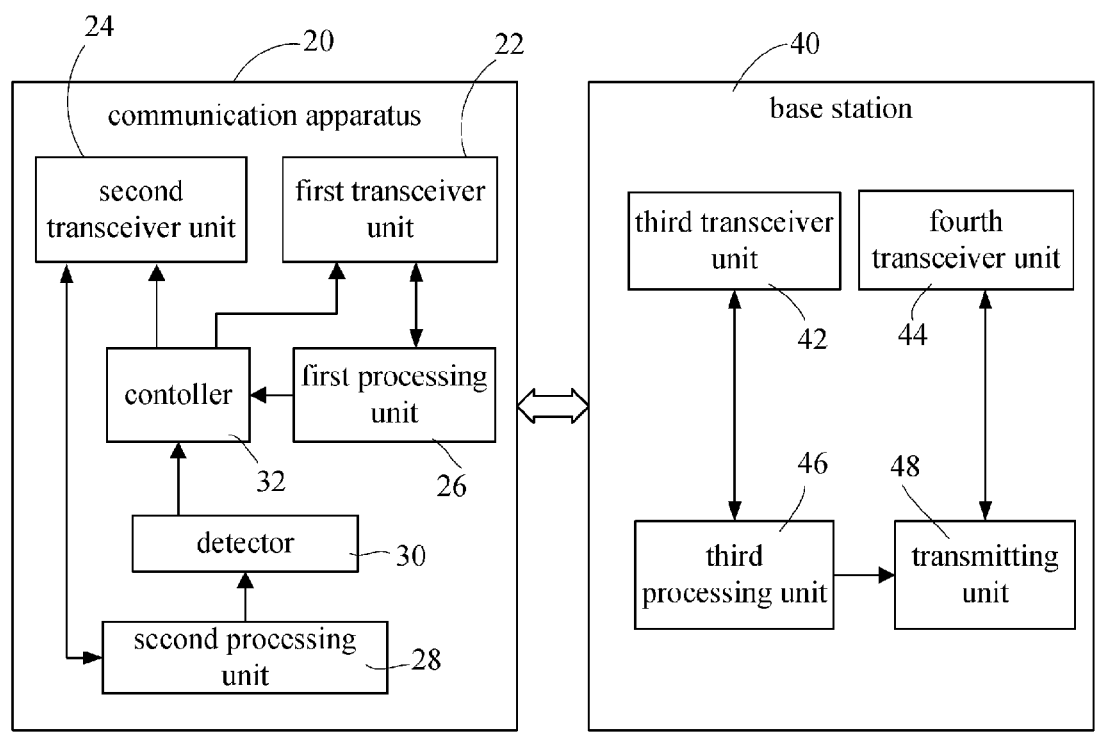
FIG. 2 is a schematic diagram showing an apparatus in accordance with an exemplary embodiment.

Referring to FIG. 2, the apparatus 20 is used to communicate with the base station 40 and exchange information with the base station 40. The apparatus 20 includes a first transceiver unit 22, a second transceiver unit 24, a first processing unit 26, a second processing unit 28, a detector 30, and a controller 32.

The first transceiver unit 22 is able to exchange a basic signal with the base station 40 using electromagnetic waves with a first frequency. The basic signal comprises basic information such as signal strength, enabled state, disabled state, and a first connection request. The first connection request is used for signaling the apparatus 20 to receive a communication signal. The communication signal comprises main communication information such as voice data, text data, image data, and so on.

The second transceiver unit 24 is able to exchange the communication signal with the base station 40 using the electromagnetic waves with a second frequency. The second frequency is higher than the first frequency. In the preferred embodiment, the second frequency is higher than or equal to 800 MHz, while the first frequency is lower than 800 MHz, such as 100 MHz.

The first processing unit 26 is used for processing the basic signal, and detecting the first connection request. If the first connection request exists in the basic signal, the first processing unit 26 accepts the first connection request. The second processing unit 28 is used for processing the communication signal to retrieve the main communication information, and generating a second connection request that is used for signaling the apparatus 20 to transmit the communication signal. The detector 30 is used for detecting the second connection request, and sending the second connection request to the controller 32.

The controller 32 is used for receiving the first connection request and/or the second connection request, and controlling the first transceiver unit 22 and the second transceiver unit 24 with the first connection request or the second connection request. That is, when the apparatus 20 is in a standby state, controller 32 cannot receive the first connection request and the second connection request. Therefore, the controller 32 enables the first transceiver unit 22 and disables the second transceiver unit 24. When the apparatus 20 is in a communication state, the controller 32 receives the first connection request or the second connection request. Therefore, the controller 32 enables the second transceiver unit 24 and disables the first transceiver unit 22

Accordingly, the base station 40 includes a third transceiver unit 42, a fourth transceiver unit 44, a third processing unit 46, and a transmitting unit 48. The third transceiver unit 42 is able to exchange the communication signal with the second transceiver unit 24. The fourth transceiver unit 44 is able to exchange the basic signal with the first transceiver unit 22. The third processing unit 46 is used for generating the communication signal and exchanging the communication signal with the third transceiver unit 42. The transmitting unit 48 is used for generating the first connection request.

In operation, when the apparatus 20 is powered on, it is in a default state, i.e. the standby state firstly. When the apparatus 20 is in the standby state, the first transceiver unit 22 receives the basic signal from the fourth transceiver 44 using the first frequency. The first processing unit 26 processes the basic signal and detects whether the first connection request is contained in the basic signal. If the first connection request is contained in the basic signal, the controller 32 enables the second transceiver unit 24, and the state of the apparatus 20 changes to the communication state. If the first connection request is not contained in the basic signal, the apparatus 20 remains in the standby state.

When the apparatus 20 is in the communication state, the second transceiver unit 24 receives the communication signal, using the second frequency, from the third transceiver unit 42. The second processing unit 28 processes the communication signal to obtain the voice information, the word information, and/or the image information of the communication signal, and other units (not shown) of the apparatus 20 will reproduce the voice information, and/or display the word information or the image information to users.

When one of the apparatuses 20 sends the communication signal to the other apparatus 20, the second processing unit 28 generates the second connection request. The detector 30 detects the second connection request. The controller 32 signals the second transceiver unit 24 to send the communication signal to the third transceiver unit 42 using the second frequency.

As mentioned above, when the apparatus 20 is in the standby state, the first transceiver unit 22 is used to communicate with the base station 40 using the electromagnetic waves with a low frequency. Therefore, the low frequency will do little harm to users.

Figure 3:
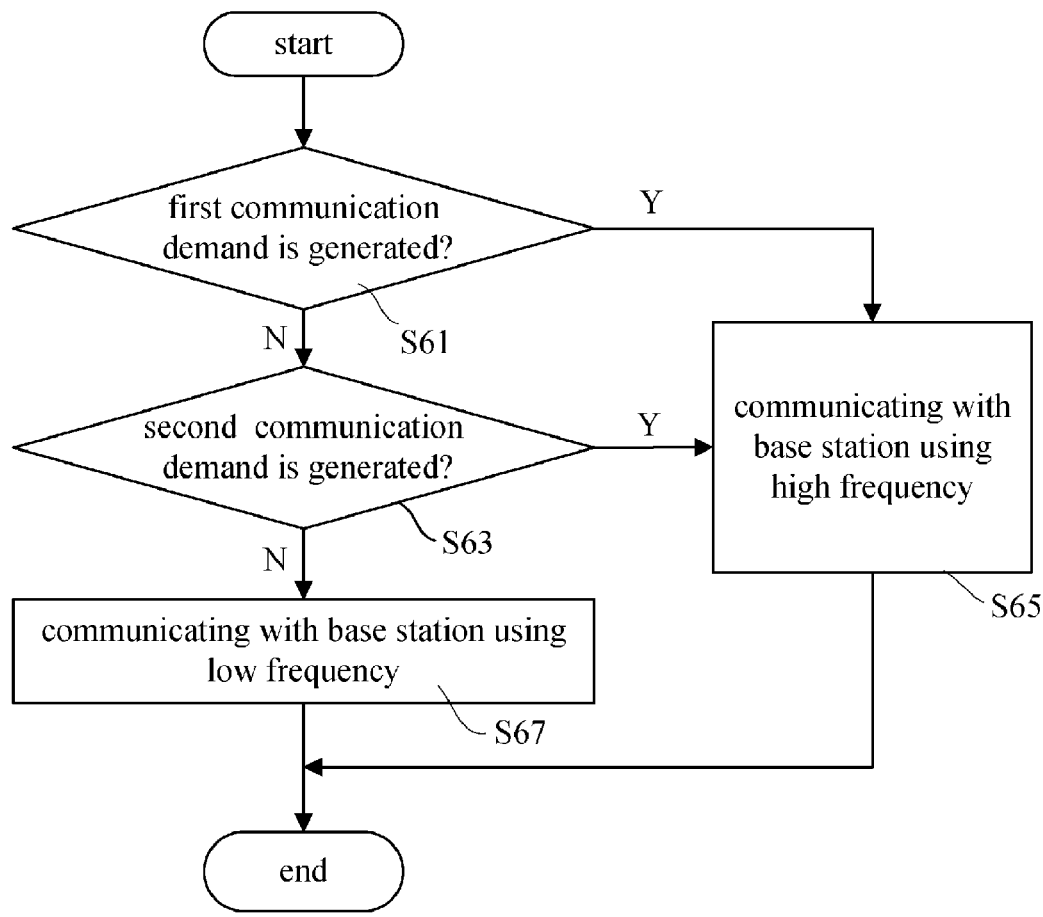
FIG. 3 is a process flow diagram showing a method in accordance with an exemplary embodiment.

Referring to FIG. 3, a flow chart showing a procedure of a method for exchanging information in the mobile communication system 10 in accordance with an exemplary embodiment is illustrated. The procedure includes the following steps.

Step S61, the apparatus 20 detects whether the first connection request is generated. If the first connection request is generated, the procedure goes to step S65. If the first connection request is not generated, the procedure goes to step S63.

Step S63, the apparatus 20 detects whether the second connection request is generated. If the second connection request is generated, the procedure goes to step S65. If the second connection request is not generated, the procedure goes to step S67.

Step S65, the second transceiver unit 24 communicates with the base station 40 using the second frequency.

Step S67, the first transceiver unit 22 communicates with the base station 40 using the first frequency that is lower than the second frequency.

Figure 4:
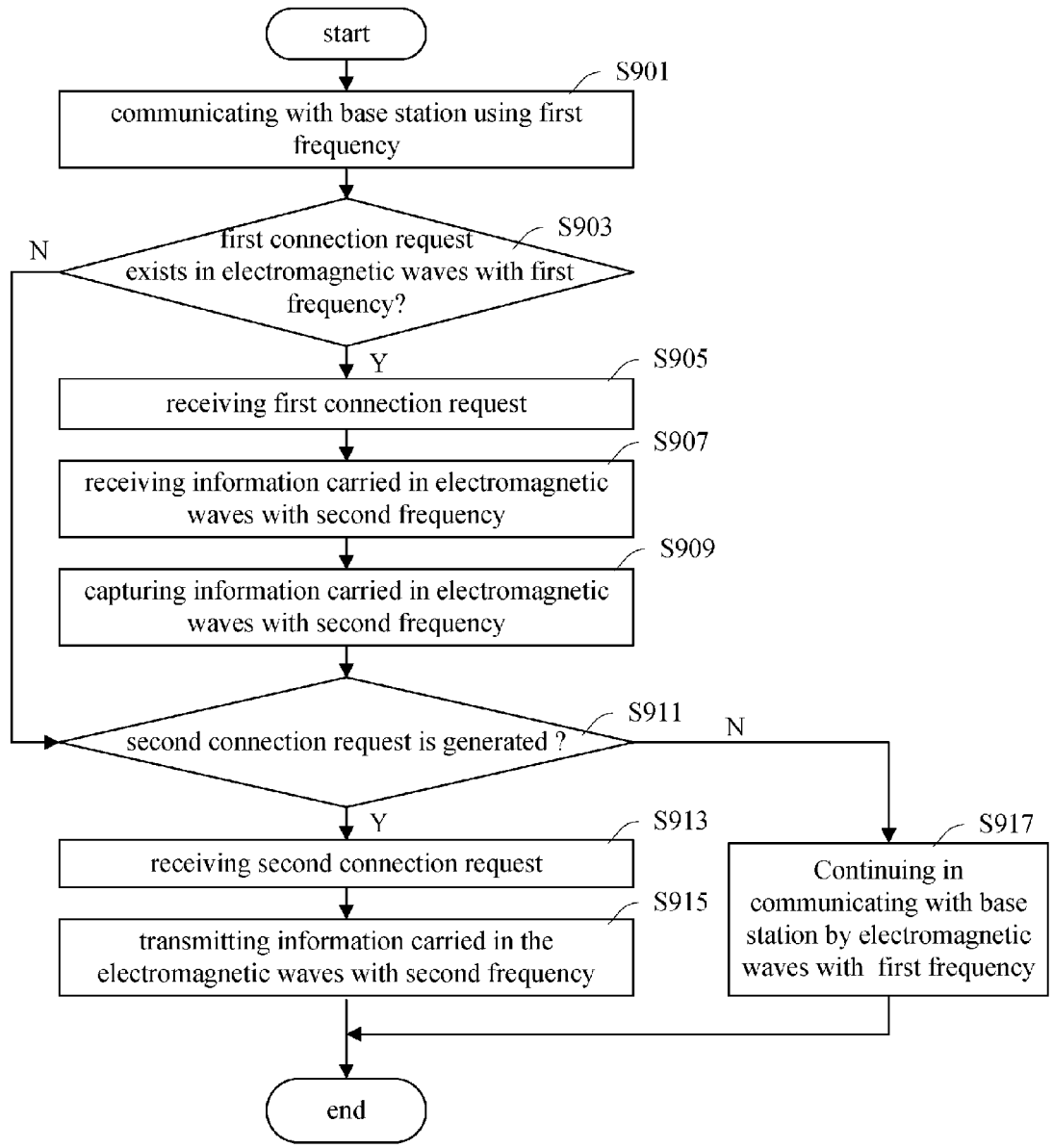
FIG. 4 is a process flow diagram showing a detailed exchanging procedure of the method of FIG. 3.

Referring to FIG. 4, a flow chart showing a detailed procedure of the method of FIG. 3 includes the following steps.

Step S901, the first transceiver unit 22 communicates with the base station 40 using the first frequency when the apparatus 20 is in the standby state. Herein, the standby state is a default state of the apparatus 20.

Step S903, the first processing unit 26 detects the first connection request carried in the electromagnetic waves with the first frequency. If the first connection request exists in the electromagnetic waves with the first frequency, the procedure goes to step 905. If the first connection request does not exist in the electromagnetic waves with the first frequency, the procedure goes to step 911.

Step S905, the controller 32 receives the first connection request and enables the second transceiver unit 24.

Step S907, the second transceiver unit 24 receives information carried in the electromagnetic waves with the second frequency from the base station 40.

Step S909, the second processing unit 28 captures information carried in the electromagnetic waves with the second frequency.

Step S911, the detector 30 detects the second connection request generated by the second processing unit 28. If the second connection request is generated, the procedure goes to step S913. If the second connection request is not generated, the procedure goes to step S917.

Step S913, the controller 32 receives the second connection request and enables the second transceiver unit 24.

Step S915, the second transceiver unit 24 transmits information carried in the electromagnetic waves with the second frequency to the base station 40.

Step S917, the first transceiver unit 22 continues in communicating with the base station 40.

Figure 5:
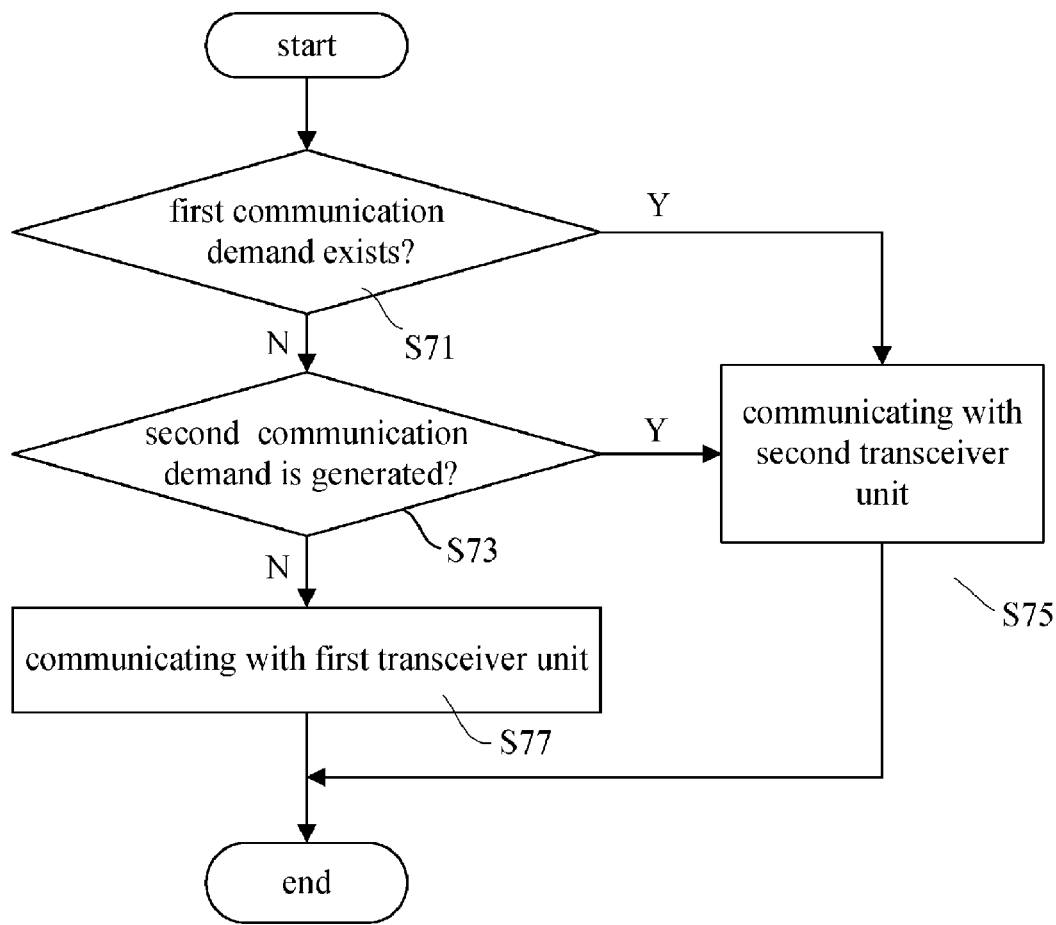
FIG. 5 is a process flow diagram showing an exchanging procedure performed by the base station corresponding to the exchanging procedure of FIG. 2.
Figure 6:
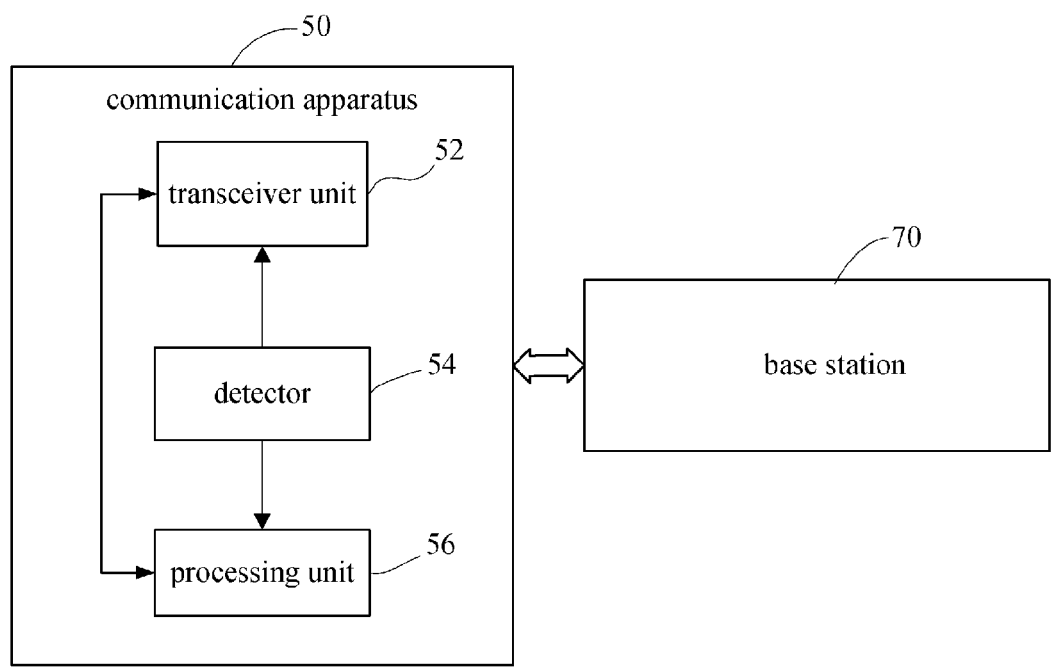
FIG. 6 is a schematic diagram showing a conventional mobile communication system.

Referring to FIG. 5, a flow chart showing a exchanging procedure performed by the base station 40 corresponding to the exchanging procedure performed by the apparatus 20. The exchanging procedure includes the following steps.

Step S71, the base station 40 detects whether the first connection request exists in the electromagnetic waves with the first frequency. If the first connection request exists in the electromagnetic waves with the first frequency, the procedure goes to step S75. If first connection request does not exist in the electromagnetic waves with the first frequency, the procedure goes to step S73.

Step S73, whether the second connection request is generated is detected. If the second connection request is generated, the procedure goes to step S75. If the second connection request is not generated, the procedure goes to step S77.

Step S75, the base station 40 communicates with the second transceiver unit 24 using the second frequency.

Step S77, the base station 40 communicates with the first transceiver unit 22 using the first frequency.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A method for exchanging information with a base station used by an apparatus, the apparatus comprising a standby state and a communication state, the method comprising:

determining whether the apparatus is in the standby state;

communicating with the base station using electromagnetic waves with a first frequency if it is determined that the apparatus is in the standby state;

determining whether the apparatus is in the communication state; and communicating with the base station using electromagnetic waves with a second frequency that is higher than the first frequency if it is determined that the apparatus is in the communication state.

2. The method according to claim 1, wherein the first frequency is lower than 800 MHz, and the second frequency is higher than or equal to 800 MHz.

3. The method according to claim 2, wherein the first frequency is 100 MHz.

4. An apparatus for exchanging information with a base station, the apparatus comprising a standby state and a communication state, the apparatus comprising:

a first transceiver unit for communicating with the base station using electromagnetic waves with a first frequency;

a second transceiver unit for communicating with the base station using electromagnetic waves with a second frequency that is higher than the first frequency; and a controller for controlling the first transceiver unit and the second transceiver unit according to states of the apparatus, the first transceiver unit being enabled and the second transceiver unit being disabled when the apparatus is in the standby state; and the first transceiver unit being disabled and the second transceiver being enabled when the apparatus is in the communication state.

5. The apparatus according to claim 4, further comprising a first processing unit for processing a basic signal carried in the electromagnetic waves with the first frequency, and detecting the basic signal for a first connection request.

6. The apparatus according to claim 5, wherein the controller enables the second transceiver unit and disables the first transceiver unit when the controller receives the first connection request from the first processing unit.

7. The apparatus according to claim 4, further comprising a second processing unit for processing a communication signal carried in the electromagnetic waves with the second frequency, and generating a second connection request when the apparatus is needed to be signaled to transmit the communication signal to the base station.

8. The apparatus according to claim 7, further comprising a detector for detecting the second communication.

9. The apparatus according to claim 8, wherein the controller enables the second transceiver unit and disables the first transceiver unit when the controller receives the second connection request from the detector.

10. The apparatus according to claim 4, wherein the first frequency is lower than 800 MHz, and the second frequency is higher than or equal to 800 MHz.

11. The apparatus according to claim 10, wherein the first frequency is 100 MHz.

12. The method according to claim 1, wherein when another apparatus needs to establish connection with the apparatus via the base station, the base station transmit a first connection request to the apparatus in the first frequency; and when it is determined that the first connection request is carried in the first frequency, the apparatus is determined in the communication state.

13. The method according to claim 12, wherein when the apparatus need to transmit the information to another apparatus via the base station, the apparatus generates a second connection request; and when it is determined that the second connection request is generated, the apparatus is determined in the communication state.

14. The method according to claim 13, wherein steps of determining whether the apparatus is in the standby state, and communicating with the base station using electromagnetic waves with a first frequency if it is determined that the apparatus is in the standby state further comprise:

detecting the first connection request is carried in the first frequency; and detecting whether the second connection request is generated if the first connection request is not carried in the first frequency; and communicating with the base station using electromagnetic waves with the first frequency if the second connection request is not generated.

15. The method according to claim 13, wherein steps of determining whether the apparatus is in the communication state; and communicating with the base station using electromagnetic waves with a second frequency that is higher than the first frequency if it is determined that the apparatus is in the communication state further comprise:

detecting the first connection request carried in the first frequency;

receiving the first connection request if the first connection request is detected; and receiving information, from the base station, using electromagnetic waves with the second frequency that is higher than the first frequency.

16. A base station for exchanging information with an apparatus which comprising a standby state and a communication state, the base station comprising:

a third transceiver unit for communicating with the apparatus using electromagnetic waves with a second frequency when the apparatus is in the communication state; and a fourth transceiver unit for communicating with the apparatus using electromagnetic waves with a first frequency that is lower than the second frequency when the apparatus is in the standby state.

17. The base station according to claim 16, further comprising a transmitting unit, when another apparatus wanting to establish connection with the apparatus via the base station, the base station generating a first connection request; and when it is determined that the first connection request is generated, the apparatus is determined in the communication state.

18. The base station according to claim 16, wherein when the apparatus needs to transmit the information to another apparatus via the base station, the apparatus transmits a second connection request to the base station; and when it is determined the second connection request is received by the base station, the apparatus is determined in the communication state.

19. The base station according to claim 16, wherein the first frequency is lower than 800 MHz, and the second frequency is higher than or equal to 800 MHz.

20. The method according to claim 13, further comprising:

detecting the second connection request;

receiving the second connection request if the second connection request is detected; and transmitting information carried in the electromagnetic waves with the second frequency to base station the base station.

* * * * *